(12) United States Patent
Au et al.

(10) Patent No.: US 11,460,713 B2
(45) Date of Patent: Oct. 4, 2022

(54) SYSTEM AND METHOD FOR ALIGNING MULTIPLE LENS ELEMENTS

(71) Applicant: ASM Technology Singapore Pte Ltd, Singapore (SG)

(72) Inventors: Po Lam Au, Hong Kong (HK); Liancheng Yang, Hong Kong (HK); Chun Ting Tang, Hong Kong (HK); Fan Leuk Lai, Hong Kong (HK); Chi Piu Wong, Hong Kong (HK)

(73) Assignee: ASM TECHNOLOGY SINGAPORE PTE LTD, Singapore (SG)

( * ) Notice: Subject to any disclaimer, the term of this patent is extended or adjusted under 35 U.S.C. 154(b) by 249 days.

(21) Appl. No.: 15/930,546

(22) Filed: May 13, 2020

(65) Prior Publication Data
US 2021/0356758 A1  Nov. 18, 2021

(51) Int. Cl.
*B29D 11/00* (2006.01)
*G01M 11/02* (2006.01)
*G01B 11/26* (2006.01)
*G02B 27/62* (2006.01)
*B25J 15/00* (2006.01)

(52) U.S. Cl.
CPC .............. *G02B 27/62* (2013.01); *B25J 15/00* (2013.01); *B29D 11/00009* (2013.01); *G01M 11/0264* (2013.01); *G01B 11/26* (2013.01)

(58) Field of Classification Search
CPC ...... G01B 11/26; G01B 11/27; G01M 11/021; G01M 11/0221; G02B 6/4226; G02B 27/62; G02B 7/003

USPC ......................... 356/153, 138; 348/188, 190
See application file for complete search history.

(56) References Cited

U.S. PATENT DOCUMENTS

| | | | | |
|---|---|---|---|---|
| 5,453,606 A * | 9/1995 | Hojo | ..................... | G01B 11/272 356/400 |
| 5,978,151 A * | 11/1999 | Hagimori | ........ | G02B 15/144107 359/557 |
| 6,678,047 B1 * | 1/2004 | Miyazaki | ................ | G01B 11/00 356/399 |
| 7,315,358 B2 * | 1/2008 | Hashimoto | ............ | G02B 27/62 356/121 |
| 9,009,952 B2 | 4/2015 | Au et al. | | |
| 2010/0118157 A1 * | 5/2010 | Ushijima | .............. | H04N 5/2254 348/208.99 |
| 2010/0205793 A1 * | 8/2010 | Ko | ........................ | H04N 5/2252 29/281.5 |

(Continued)

*Primary Examiner* — Isiaka O Akanbi
(74) *Attorney, Agent, or Firm* — Ostrolenk Faber LLP

(57) ABSTRACT

A lens assembly is separated into a first lens module including at least one lens element and a second lens module including at least one other lens element during alignment of its lens elements. Coarse alignment is conducted by aligning an optical axis of at least one lens element within the first lens module with an optical axis of at least one lens element within the second lens module. For conducting fine alignment, an image sensor views a test chart while the first and second lens modules are positioned between the test chart and the image sensor. Image quality indices are obtained from the image sensor of the test chart at different relative alignments between the first and second lens modules, before the first lens module is fixed to the second lens module at a relative alignment therebetween where the image quality indices are optimized.

17 Claims, 5 Drawing Sheets

(56) References Cited

U.S. PATENT DOCUMENTS

2012/0113413 A1* 5/2012 Miahczylowicz-Wolski ............... G02B 7/023
356/124.5
2012/0133924 A1* 5/2012 Heinisch ............ G01M 11/0221
356/73
2018/0348466 A1* 12/2018 Hirth ..................... G02B 7/003

* cited by examiner

SYSTEM AND METHOD FOR ALIGNING MULTIPLE LENS ELEMENTS

FIELD OF THE INVENTION

The invention relates to the alignment of multiple lens elements of a lens assembly in order to obtain an optimized image quality in an optical system, when the lens assembly is coupled to an image sensor.

BACKGROUND AND PRIOR ART

In the assembly of optical systems for camera modules, such as those found in smartphones and portable personal devices, the optical performance or imaging quality of the camera module is much dependent on accurate alignment of its optical components. These include the alignment between a lens assembly and an image sensor chip, as well as precise alignment between the lens elements comprised in the lens assembly.

During alignment of the aforesaid optical components, a camera module Active Alignment (AA) process is used to optimally align the lens assembly to the image sensor chip. During this process, the image sensor is electrically operated to capture images of a test chart through the lens assembly, such as described in U.S. Pat. No. 9,009,952 entitled "Apparatus for assembling a lens module and an image sensor to form a camera module, and a method of assembling the same". In order to produce a camera module with an optimized image quality obtained at least at central and periphery areas of the image sensor, a six-axis motion system may be utilized to hold the lens assembly or the image sensor chip to ensure that the image sensor chip is precisely aligned with an imaging plane of the lens assembly.

Additionally, to avoid degradation of the image quality arising from the lens assembly itself, each lens element needs to be accurately designed and fabricated, and the assembly tolerance of each lens element needs to be precisely controlled. In a conventional lens assembly, individual lens elements comprised in the lens assembly are mounted onto a lens holder piece by piece. In order to rigidly fix each lens element during the mounting process, different inter-locking designs are required to maintain their orientations relative to one another. However, when the number of lens elements increases, the assembly tolerance requirement becomes tighter, and assembly errors in such a design become harder to control. Meanwhile, during conventional mounting and assembly of lens elements, it is not possible to manage the optical performance of the lens assembly as a whole, due to the accumulated assembling error arising from factors such as the mounting accuracy and manufacturing imperfections arising from each lens element. Hence, the final yield loss in the production of lens assemblies will tend to rise when the number of lens elements comprised in each lens assembly increases.

FIG. 1 is a cross-sectional view of a conventional lens assembly including a plurality of lens elements assembled in an interlocking lens holder 100. During AA, the lens elements mounted in the interlocking lens holder 100 are aligned with respect to a functional image sensor 104 that is located on a sensor board 102. After alignment, the interlocking lens holder 100 is affixed to the sensor board 102, ideally in an aligned orientation wherein an optical axis of the functional image sensor 104 coincides with an optical axis of the lens assembly to ensure that the functional image sensor 104 is precisely aligned with an imaging plane contributed by the plurality of lens elements. However, the plurality of lens elements 106, 108, 110, 112, 114 may individually comprise differently-oriented optical axes, with the consequence that an overall optical axis 116 of the lens assembly may excessively deviate from an optical axis of the functional image sensor 104, making it difficult or impossible to accurately align the overall optical axis 116 of the lens elements with the optical axis of the functional image sensor 104. In this respect, alignment between optical axes of the lens assembly and the functional image sensor 104 could be made more accurate if the overall optical axis 116 were to be pre-aligned with an expected optical axis of the functional image sensor 104, to avoid excessive deviation when seeking to affix the interlocking lens holder 100 to the sensor board 102.

It would thus be beneficial to devise a system and method for pre-aligning multiple lens elements comprised in a lens assembly to achieve a desired overall optical axis 116 of the lens assembly. In doing so, an alignment of the functional image sensor 104 relative to the lens assembly can be assured, so as to obtain an optimal image quality in a resulting product.

SUMMARY OF THE INVENTION

It is thus an object of the invention to seek to provide a method for aligning multiple lens elements comprised in a lens assembly.

Accordingly, the invention provides a method for aligning multiple lens elements comprised in a lens assembly, the method comprising the steps of: separating the lens assembly into a first lens module comprising at least one lens element and a second lens module comprising at least one other lens element; conducting coarse alignment between the first and second lens modules by aligning an optical axis of at least one lens element comprised in the first lens module with an optical axis of at least one lens element comprised in the second lens module; viewing a test chart with an image sensor while the first and second lens modules are positioned between the test chart and the image sensor; conducting fine alignment between the first and second lens modules by obtaining image quality indices from the image sensor of the test chart at different relative alignments between the first and second lens modules; and thereafter fixing the first lens module to the second lens module at a relative alignment therebetween where the image quality indices are optimized.

It would be convenient hereinafter to describe the invention in greater detail by reference to the accompanying drawings which illustrate specific preferred embodiments of the invention. The particularity of the drawings and the related description is not to be understood as superseding the generality of the broad identification of the invention as defined by the claims.

BRIEF DESCRIPTION OF THE DRAWINGS

An exemplary process for aligning lens elements in accordance with the invention will now be described with reference to the accompanying drawings, in which.

DETAILED DESCRIPTION OF THE PREFERRED EMBODIMENT OF THE INVENTION

Figure 1:
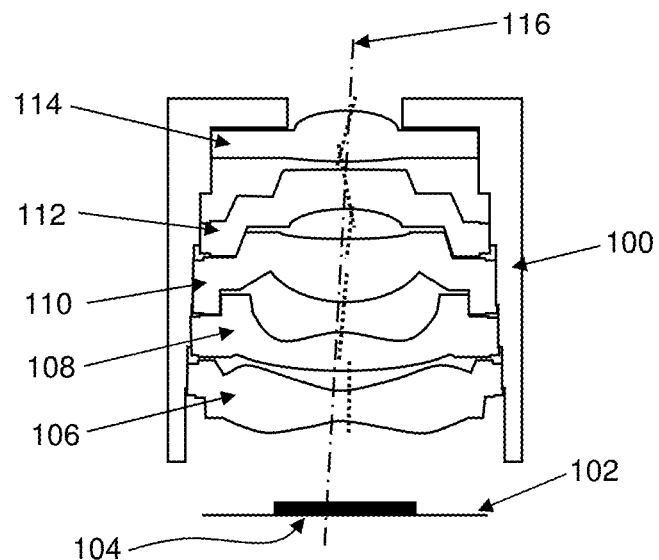
FIG. 1 is a cross-sectional view of a conventional lens assembly including a plurality of lens elements assembled in an interlocking lens holder.
Figure 2:
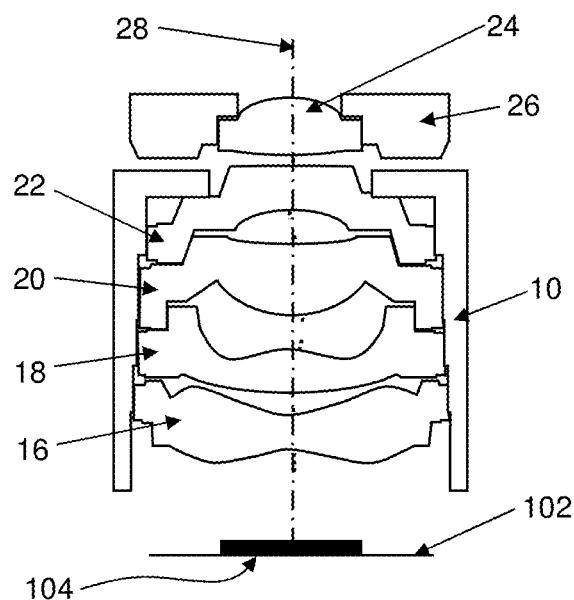
FIG. 2 is a cross-sectional view of a lens assembly in which one of its lens elements has been removed from an interlocking lens holder for implementing an alignment process according to the preferred embodiment of the invention.

FIG. 2 is a cross-sectional view of a lens assembly in which one of its lens elements 26 has been removed from an interlocking lens holder 10 for implementing an alignment process according to the preferred embodiment of the invention. An entire lens assembly in the illustrated embodiment comprises five lens elements 16, 18, 20, 22, 24. Four of these lens elements 16, 18, 20, 22 are assembled in the interlocking lens holder 10, wherein the interlocking lens holder 10 is configured to be affixed to a sensor board on which a functional image sensor 104 is located after the functional image sensor 104 has been aligned with the combined lens elements 16, 18, 20, 22, 24 in the lens assembly.

As shown in FIG. 2, in this embodiment, one of the lens elements 24 comprised in the lens assembly has been detached from the interlocking lens holder 10, and is assembled instead on a separate detached lens holder 26 to form a separate lens module. This enables the detached lens element 24 to be pre-aligned relative to the plurality of other lens elements 16, 18, 20, 22 in the other lens module so that an overall optical axis 28 of the lens assembly is pre-aligned as far as possible with an expected optical axis of the functional image sensor 104. In general, since the overall lens assembly will ultimately be mounted onto a sensor board on which a functional image sensor in a final product is mounted, the overall optical axis 28 should be substantially perpendicular to an image plane of such a functional image sensor 104. This would help to ensure more accurate alignment between the lens assembly and the functional image sensor that would be used with the lens elements in an assembled final camera module product.

In order to achieve such alignment between the lens elements 16, 18, 20, 22, 24 of the lens assembly with high productivity, coarse alignment between the lens elements should first be conducted. Coarse alignment is for the purpose of quickly aligning an optical axis of the detached lens element 24 with that of the remaining lens elements in the lens assembly, and may be performed by optical detection of multiple surfaces of the lens elements. Such coarse alignment should also orientate the optical axes to be substantially perpendicular to an expected image plane of the functional image sensor in a final camera module product. However, while such coarse alignment is used to achieve an approximate alignment of the respective optical axes, it is by itself not sufficiently accurate, and fine alignment should later be implemented to conduct alignment to a higher degree of accuracy.

Figure 3A:
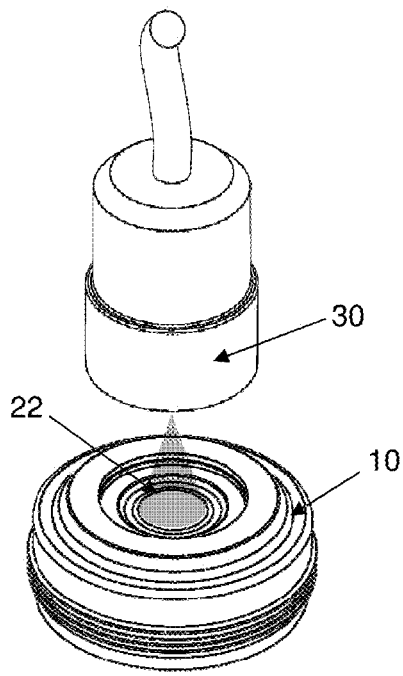
FIG. 3A is an isometric view of an optical detector measuring spherical surfaces of at least one lens element comprised in the interlocking lens holder.

In respect of the coarse alignment process, FIG. 3A is an isometric view of an optical detector 30 which is used for measuring spherical surfaces of at least one lens element comprised in the interlocking lens holder 10. In this case, as the interlocking lens holder 10 comprises four separate lens elements 16, 18, 20, 22, in the interests of enhancing productivity, measurement is conducted only on the lens element 22 located at a top end of the interlocking lens holder 10. Such measurement involves measuring spherical profiles of surfaces on both sides of the lens element 22. Hence, the optical detector 30 may be in the form of, for instance, a three-dimensional scanner or a laser leveling sensor, which is not only able to inspect and measure the spherical profile of the side of the lens element 22 directly facing it, but also "look through" the lens element 22 to inspect an opposite side of the lens element 22.

Accordingly, in this embodiment, only an optical axis of the top lens element 22 is measured, and the remainder of the lens elements 16, 18, 20 in the lens assembly mounted on the interlocking lens holder 10 are ignored. In case there is a residual alignment error between the top lens element 22 and the remaining lens elements in the interlocking lens holder 10, fine alignment which is adopted later in the process would still serve to optimize the imaging quality in the final active alignment process. Nonetheless, if desired and cycle time is not an issue, it is possible for the optical detector 30 to look beyond the top lens element 22 to also measure spherical profiles of each of the other lens elements 16, 18, 20 comprised in the interlocking lens holder 10.

Figure 3B:
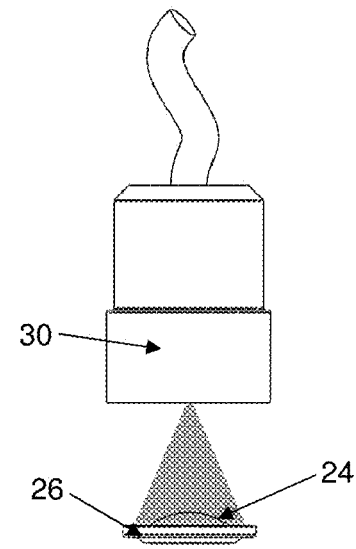
FIG. 3B is an isometric view of the optical detector measuring spherical surfaces of a detached lens element.

Besides measuring the surfaces of the top lens element 22 included in the interlocking lens holder 10, FIG. 3B is an isometric view of the optical detector 30 being used to measure spherical surfaces of the detached lens element 24. The optical detector 30 is positioned on one side of the detached lens element 24 to inspect and measure the spherical profile of a first surface of the detached lens element 24 facing the optical detector 30, and the optical detector 30 is also operative to inspect and measure the spherical profile of a second surface of the detached lens element 24 opposite to the first surface, through the first surface. Hence, both sides of the spherical surfaces of the detached lens element 24 are similarly measured.

Figure 4A:
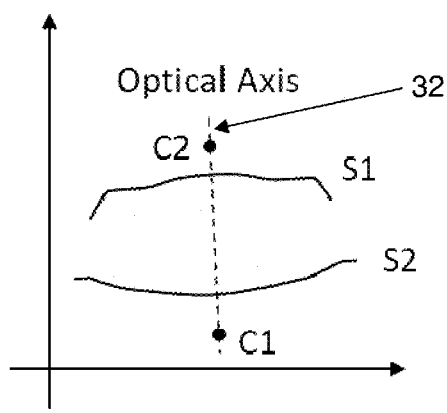
FIG. 4A illustrates a measured spherical profile of a lens element comprised in the interlocking lens holder.

FIG. 4A illustrates a measured spherical profile of the top lens element 22 comprised in the interlocking lens holder 10. A first spherical profile S1 of a first side and a second spherical profile S2 of a second side of the top lens element 22 are obtained. Based on the first spherical profile S1, a first spherical center C1 calculated from the first spherical profile S1 is obtained. Similarly, based on the second spherical profile S2, a second spherical center C2 calculated from the second spherical profile S2 is further obtained. An approximate optical axis 32 of the top lens element 22 is thus determined to be a line passing through C1 and C2.

Figure 4B:
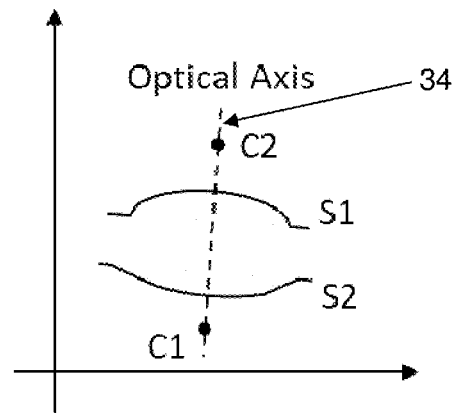
FIG. 4B illustrates a measured spherical profile of the detached lens element.

FIG. 4B illustrates a measured spherical profile of the detached lens element 24 assembled on the detached lens holder 26. A first spherical profile S1 of a first side and a second spherical profile S2 of a second side of the detached lens element 24 are obtained. Based on the first spherical profile S1, a first spherical center C1 calculated from the first spherical profile S1 is derived. Similarly, based on the second spherical profile S2, a second spherical center C2 calculated from the second spherical profile S2 is also derived. An approximate optical axis 34 of the detached lens element 24 is thus determined to be a line passing through C1 and C2. For the purposes of coarse alignment, the optical axis 32 of the top lens element 22 should be arranged coaxially with the optical axis 34 of the detached lens element 24, so that the optical axes 32, 34 are coaxially aligned.

Additionally, during the coarse alignment process, the optical axis 32, 34 of each lens module should ideally also be aligned to a datum contributed by the system. Based on this, the relative optical shift between the two lens modules as well as an overall optical axis 28 are adjusted to register with a desired imaging plane of an image sensor for performing AA.

The coarse search system therefore utilizes an optical approach to measure the curvatures of each lens surface, to thereby determine a spherical center of each lens surface. Based on the spherical centers C1, C2 of both lens surfaces on each lens element 22, 24, the optical axis 32, 34 of each lens element 22, 24 may be determined.

Figure 5:
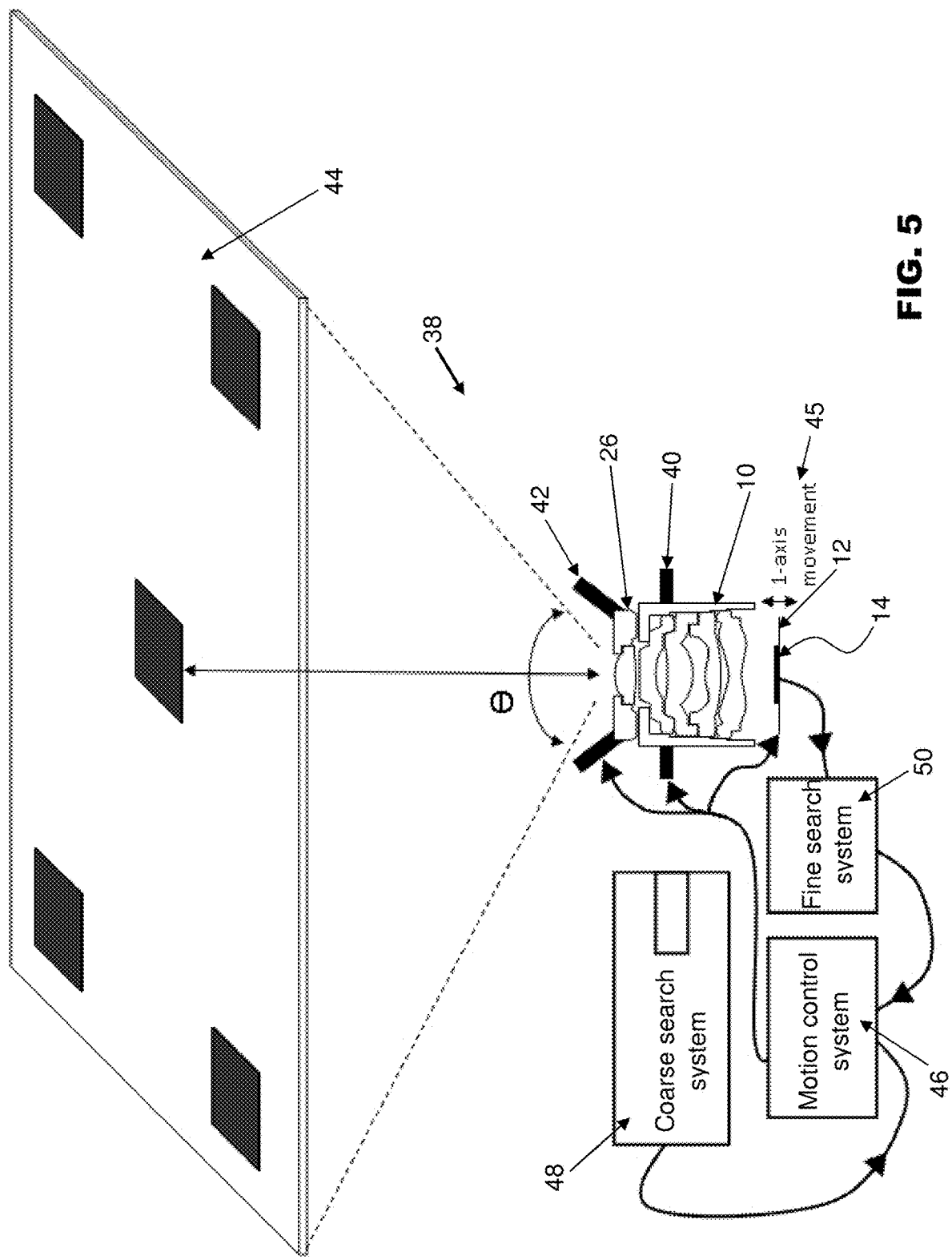
FIG. 5 illustrates a layout of a lens alignment apparatus which may be used for carrying out the alignment process according to the preferred embodiment of the invention.

FIG. 5 illustrates a layout of a lens alignment apparatus 38 which may be used for carrying out the alignment process according to the preferred embodiment of the invention. The lens alignment apparatus 38 provides a solution for quickly aligning two lens modules to achieve the best overall lens imaging quality for a lens assembly.

In the illustrated lens alignment apparatus 38, a twelve-axis handling system holds and manipulates first and second lens modules, and may adjust each of the respective lens modules in six degrees-of-freedom (DoF) (i.e. each lens module is adjustable in X, Y, Z and rotational directions). In summary, a coarse search system first measures a decentering shift in the optical axes 32, 34 of the first and second modules in the order of micron-level accuracy and a tilt or rotational shift in several arcminutes. From the measurement feedback, the handling system is capable of aligning each lens module in six DoFs coarsely.

Next, a fine search system which comprises a golden image sensor and a test chart is utilized to obtain the imaging quality indices in respect of the two lens modules. As the imaging quality in the fine search system is sensitive in the order of sub-micron-level decentering shift and arcsecond-level tilt shift of the two lens modules, from the imaging quality feedback, the handling system is capable of aligning the two lens modules with very fine precision. After achieving the optimal alignment positions for both lens modules relative to each other, an adhesive will be dispensed on the connecting surfaces of the lens modules, and the lens modules are fixed to each other.

In more detail, the lens alignment apparatus 38 has a first gripper 40 for gripping the interlocking lens holder 10 and a second gripper 42 for gripping the detached lens holder 26. Each of the first and second grippers 40, 42 is capable of orienting the interlocking lens holder 10 and the detached lens holder 26 in six degrees of freedom in order to align the multiple lens elements assembled in the interlocking lens holder 10 with the detached lens element 24 assembled on the detached lens holder 26. In combination, the first and second grippers 40, 42 thus allow the lens alignment apparatus 38 to manipulate and align the lens elements 16, 18, 20, 22, 24 in twelve degrees of freedom.

The first and second grippers 40, 42 are operatively connected to a master control system 46 for controlling their respective movements. A coarse search system 48 provides data on the optical axis 32 of the top lens element 22 and the optical axis 34 of the detached lens element 24 during coarse searching in order for the master control system 46 to instruct the first and second grippers 40, 42 to manipulate the optical axes 32, 34 to be coaxial with each other. To do so, the optical detector 30 is locatable over the first lens module (comprising the lens elements included in the interlocking lens holder 10) and the second lens module (comprising the detached lens holder 26) respectively, to measure the spherical surface profiles S1, S2 of the top lens element 22 and detached lens element 24, as described in relation to FIGS. 3A, 3B, 4A and 4B.

For performing fine alignment, there is also a fine search imaging system 50 operatively connected to the master control system 46. The fine search imaging system 50 is electrically connected to the image sensor 14, which is utilized to view or observe a test chart 44 through the lens elements 16, 18, 20, 22, 24 comprised in the first and second lens modules. The test chart 44 is arranged such that the field of view of the test chart 44 from the detached lens element 24 has an angle θ.

In the course of fine alignment, the fine search imaging system 50 generates various quality parameters in relation to the images captured by the image sensor 14. Such quality parameters may include, but is not limited to optical transfer function (OTF), modulation transfer function (MTF), spatial frequency response (SFR), a contrast transfer function (CTF), a TV line, or any other evaluation method known in the art that can represent the resolution of an imaging system. Moreover, to obtain more accurate quality parameters, the image sensor 14 used should preferably be a golden image sensor, which is a standard sensor of known and preferably superior quality, and serves as a point of reference against which all lens elements to be aligned may be measured against.

In particular, the fine search imaging system 50 has a positioning table 45 configured to move along a single axis towards or away from the test chart 44. The image sensor 14 is located on the positioning table 45. In FIG. 5, this is represented by vertical single-axis motion of the sensor board 12. From a through-focus scanning of the image sensor 14 by the fine search imaging system 50, a plurality of imaging quality curves (such as MTF, SFR or relative illumination curves, etc.) can be obtained in relation to images of the test chart 44. Based on these imaging quality curves, certain lens imaging quality indices (such as peak MTF, imaging plane tilt, lens field curvature inclination, sagittal and tangential MTF peak separation, etc.) may be derived.

Generally, a design of each lens element has a specific optical model of imaging quality variation based on decentering, tilt and gap shift relating to the first and second lens modules. Thus, from the aforesaid optical models, even minor shifts between the first and second lens modules may be calculated and the lens modules may be further aligned with respect to each other.

Figure 6:
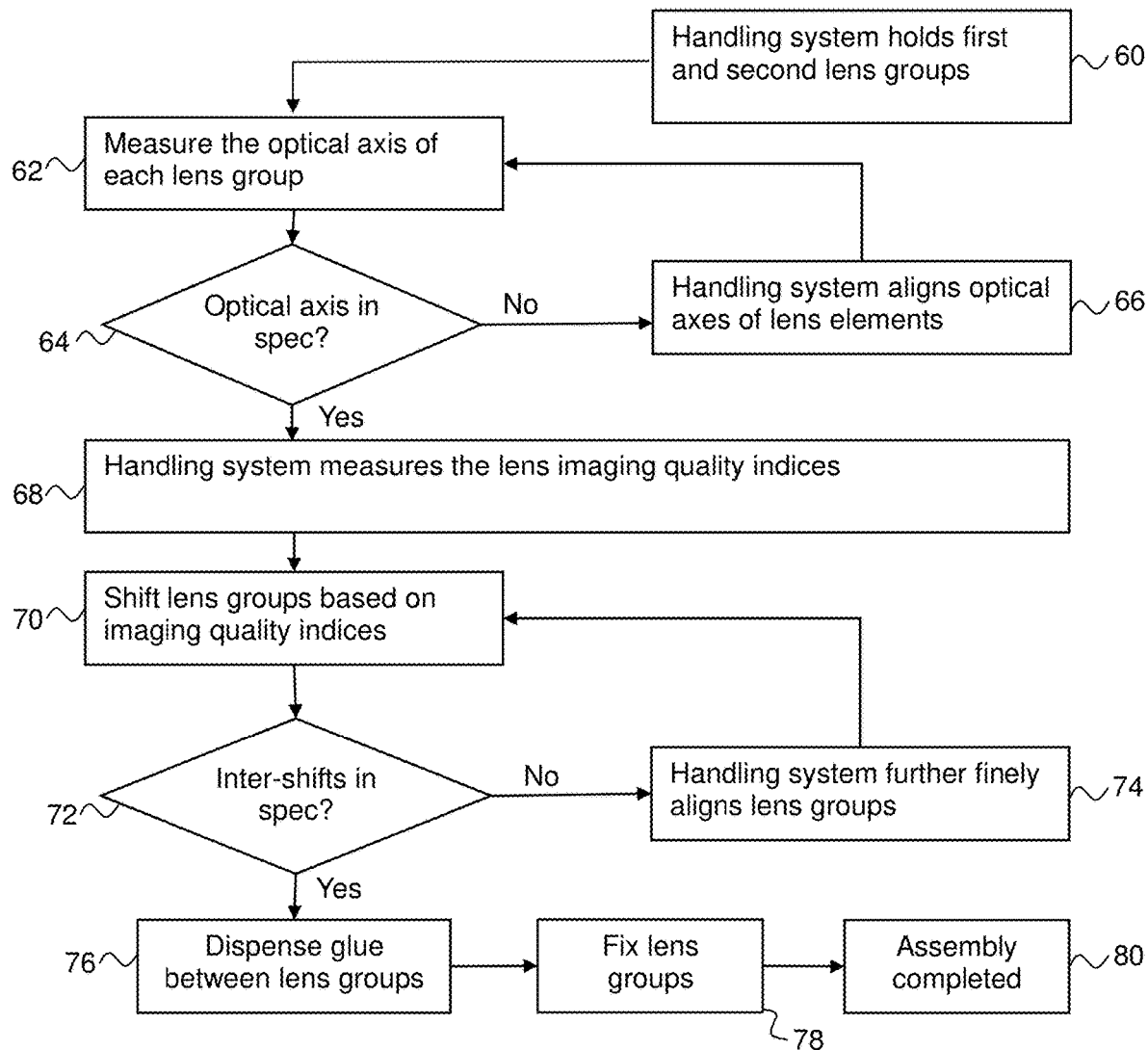
FIG. 6 is a flowchart showing an exemplary alignment process.

FIG. 6 is a flowchart showing an exemplary alignment process. At step 60, a handling system including the first and second grippers 40, 42 holds a first lens module comprising the lens elements 16, 18, 20, 22 assembled in the interlocking lens holder 10 and a second lens module, in this case, the detached lens element 24 assembled on the detached lens holder 26. At step 62, the optical detector 30 measures the optical axes 32, 34 of the top lens element 22 and the detached lens element 24 during a coarse alignment process such as that described above.

At step 64, if the optical axes 32, 34 are not axially aligned to within a predetermined specification, then at step 66, the handling system further adjusts the lens elements 22, 24 to better align their optical axes before alignment is checked again. Once it is determined that the coarse alignment is within the predetermined specification, at step 68, the handling system measures the lens imaging quality indices in the course of conducting fine searching. The lens imaging quality indices may include one or more of the quality parameters captured by the image sensor 14 as set out above.

At step 70, the first and second grippers 40, 42 move and adjust the lens elements 22, 24 relative to each other based on the lens imaging quality indices that have been obtained. At step 72, it is determined whether the inter-shifts between the lens elements 22, 24 cause the image quality to be within a predetermined quality requirement. If not, then at step 74, the handling system will further finely align the lens elements 22, 24 relative to each other before checking again whether the inter-shifts between the lens elements 22, 24 cause the image quality to be within a predetermined quality requirement.

At step 76, once a desired image quality has been obtained, an adhesive such as glue is dispensed between the first and second lens modules. After the lens modules have been fixed relative to each other by curing at step 78, the assembly is completed (step 80).

Figure 7:
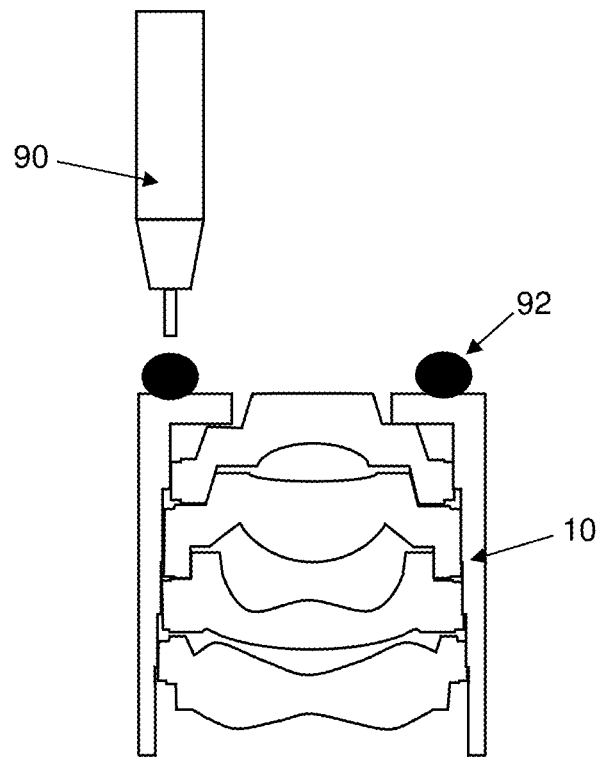
FIG. 7 shows an adhesive dispenser dispensing an adhesive onto the interlocking lens holder.
Figure 8:
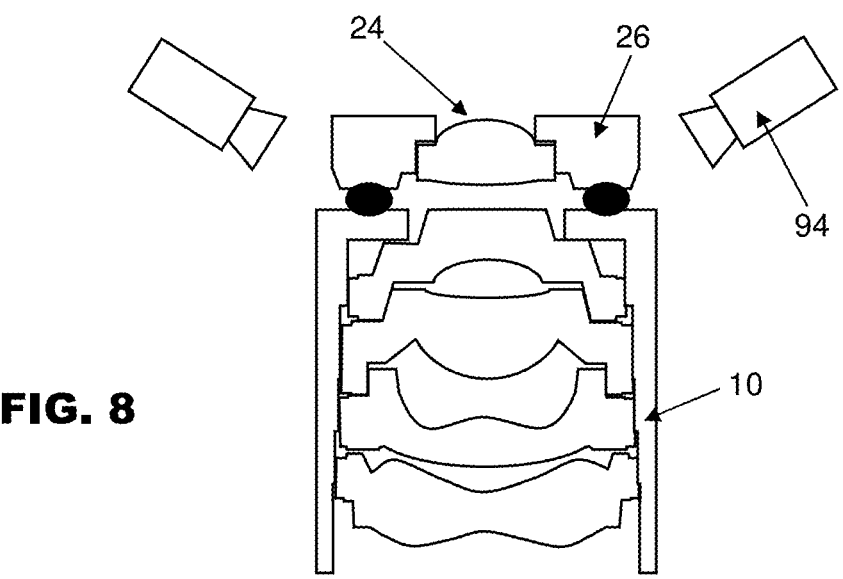
FIG. 8 shows the detached lens element being fixed to the interlocking lens holder in an aligned position.

FIG. 7 shows an adhesive dispenser 90 dispensing an adhesive 92 onto the interlocking lens holder 10. The adhesive 92 may be an ultraviolet light-activated adhesive. In FIG. 8, the detached lens element 24 assembled on the detached lens holder 26 is fixed to the other lens elements 16, 18, 20, 22 by placing the detached lens holder 26 onto the adhesive 92. If the adhesive 92 is an ultraviolet light-activated adhesive, the adhesion between the detached lens holder 26 and the interlocking lens holder 10 is solidified (with the detached lens element 24 in an aligned position) by curing the adhesive 92 using an ultraviolet lighting system 94.

In conclusion, the alignment method according to the present invention provides a systematic method for speedy alignment of first and second lens modules which combine to constitute a lens assembly. It presents a hardware system with dual-path alignment approaches, and a handling system which includes two six-axis motion systems to separately hold and manipulate the first lens module and the second lens module relative to each other. The dual-path alignment approach combines a coarse search process and then a fine search process to quickly align the relative positions of the two lens modules in X, Y, Z and rotational directions. The coarse search system rapidly measures and aligns the optical axis of the two lens modules from sub-millimeter level to micron level accuracy. The fine search system comprises a test chart and a golden image sensor 14, wherein the golden image sensor 14 is installed on a positioning table for lens imaging quality measurement, with closed-loop feedback from the imaging quality indices that are obtained. The alignment accuracy can therefore be further improved to sub-micron level accuracy. Finally, an adhesive application system is adopted to dispense an adhesive, such as ultraviolet glue or ultraviolet-thermal glue, between the connecting surfaces of the respective lens modules. To cure the said glue, an ultraviolet lighting system 94 cures the glue on the connecting surfaces of two lens modules to complete the construction of the lens assembly.

It should be appreciated that the method according to the embodiment of the invention described above offers the benefits of yield improvement, accuracy and speed.

Yield Improvement is achievable as compared to traditional lens assembly processes which result in low yield when the lens systems designs have a larger number of lens elements. The method of the present invention can significantly improve the yield by implementing an AA process that includes accurate lens imaging quality measurement.

Accuracy is improved as the imaging quality obtained from a golden image sensor 14 is able to reveal minor misalignments of the first and second lens modules. Moreover, the twelve-axis handling system of the lens alignment apparatus 38 including a through-focus scanning approach along at least one motion axis provides high precision motion and sufficient DoF to adjust any misalignment between the first and second lens modules.

Furthermore, the dual-path alignment approach provides a fast coarse alignment of the first and second lens modules, during which the optical axes of respective lens elements are measured and aligned. Such coarse search of the optical axis 32, 34 of each lens element only requires one image to be captured, and can be effectively completed within a short image-capturing time frame. Since the coarse search system requires no additional movement, such as rotation or scanning, of the lenses to measure the optical axis, this part of the alignment can be completed much faster than traditional approaches that are adopted to align multiple lens elements, whilst fine searching is thereafter conducted to make the alignment even more precise.

The invention described herein is susceptible to variations, modifications and/or additions other than those specifically described and it is to be understood that the invention includes all such variations, modifications and/or additions which fall within the spirit and scope of the above description.

The invention claimed is:

1. A method for aligning multiple lens elements comprised in a lens assembly, the method comprising the steps of:
    separating the lens assembly into a first lens module comprising at least one lens element and a second lens module comprising at least one other lens element;
    conducting coarse alignment between the first and second lens modules by aligning an optical axis of at least one lens element comprised in the first lens module with an optical axis of at least one lens element comprised in the second lens module;
    viewing a test chart with an image sensor while the first and second lens modules are positioned between the test chart and the image sensor;
    conducting fine alignment between the first and second lens modules by obtaining image quality indices from the image sensor of the test chart at different relative alignments between the first and second lens modules; and thereafter
    fixing the first lens module to the second lens module at a relative alignment therebetween where the image quality indices are optimized.

2. The method as claimed in claim 1, wherein the first lens module comprises a plurality of lens elements and the second lens module comprises a single lens element.

3. The method as claimed in claim 1, wherein the step of coarse alignment comprises measuring with an optical detector spherical profiles of surfaces on both sides of at least one lens element comprised in the first lens module, and at least one lens element comprised in the second lens module.

4. The method as claimed in claim 3, further comprising the steps of, with respect to each at least one lens element:
    calculating a first spherical center from the spherical profile of a first surface of the lens element;

calculating a second spherical center from the spherical profile of a second surface of the lens element opposite to the first surface; and deriving the optical axis of the lens element from a line passing through the first and second spherical centers.

5. The method as claimed in claim 4, wherein the step of aligning the optical axis of the at least one lens element of the first and second lens modules comprises coaxially aligning the lines passing through the first and second spherical centers of the lens elements of the first and second lens modules.

6. The method as claimed in claim 3, wherein the optical detector comprises a three-dimensional scanner or a laser leveling sensor.

7. The method as claimed in claim 3, wherein the optical detector is positioned on one side of the at least one lens element and is operative to inspect and measure the spherical profile of a first surface of a lens element facing the optical detector, as well as a second surface of the lens element opposite to the first surface through the first surface.

8. The method as claimed in claim 1, wherein the steps of conducting coarse alignment and fine alignment further comprise gripping the first lens module with a first gripper, gripping the second lens module with a second gripper, and viewing the test chart with the image sensor while manipulating the first and second lens modules with the first and second grippers.

9. The method as claimed in claim 8, wherein each of the first and second grippers is configured to manipulate the first or second lens module in six degrees of freedom.

10. The method as claimed in claim 1, further comprising observing the test chart through the lens elements comprised in the first and second lens modules with a fine search imaging system that is electrically connected to the image sensor.

11. The method as claimed in claim 10, wherein during the course of fine alignment, the fine search imaging system generates multiple quality parameters in relation to images captured by the image sensor.

12. The method as claimed in claim 11, wherein the quality parameters are selected from the group consisting of: optical transfer function, modulation transfer function, spatial frequency response, contrast transfer function and TV line.

13. The method as claimed in claim 10, further comprising the step of locating the image sensor on a positioning table configured to move along a single axis, and conducting through-focus scanning by moving the image sensor along the single axis to derive the image quality indices.

14. The method as claimed in claim 1, wherein the image sensor is a golden image sensor.

15. The method as claimed in claim 1, wherein the step of fixing the first lens module to the second lens module further comprises dispensing an ultra-violet light-activated adhesive on the first and/or second lens module, attaching connecting surfaces of the first and second modules to each other, and curing the ultra-violet light-activated adhesive with ultra-violet light.

16. The method as claimed in claim 1, further comprising the step of mounting the first and second lens modules to a sensor board on which a functional image sensor of a final product is mounted.

17. The method as claimed in claim 16, wherein the step of coarse alignment comprises further orienting the said optical axes to be substantially perpendicular to an expected image plane of the functional image sensor.

* * * * *